US009584974B1

(12) United States Patent
Omer et al.

(10) Patent No.: US 9,584,974 B1
(45) Date of Patent: Feb. 28, 2017

(54) DETECTING MOTION BASED ON REFERENCE SIGNAL TRANSMISSIONS

(71) Applicant: Cognitive Systems Corp., Waterloo (CA)

(72) Inventors: Mohammad Omer, Waterloo (CA); Yunfeng Piao, Kitchener (CA); Mikhail Alexand Zakharov, Guelph (CA); Marco Paulo dos Santos Nogueria, Cambridge (CA); Stephen Arnold Devison, Kitchener (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/151,571

(22) Filed: May 11, 2016

(51) Int. Cl.
H04W 4/02 (2009.01)
H04B 17/27 (2015.01)
H04B 17/309 (2015.01)
G01S 13/52 (2006.01)

(52) U.S. Cl.
CPC ............ *H04W 4/023* (2013.01); *H04B 17/27* (2015.01); *H04B 17/309* (2015.01); *G01S 13/52* (2013.01)

(58) Field of Classification Search
None
See application file for complete search history.

(56) References Cited

U.S. PATENT DOCUMENTS

| 4,740,045 | A | 4/1988 | Goodson et al. |
|---|---|---|---|
| 5,270,720 | A | 12/1993 | Stove |
| 5,696,514 | A | 12/1997 | Nathanson et al. |
| 6,493,380 | B1 * | 12/2002 | Wu .......................... G01S 5/02 342/417 |
| 7,295,109 | B2 | 11/2007 | Kobayashi |
| 8,138,918 | B2 | 3/2012 | Habib et al. |
| 8,836,344 | B2 | 9/2014 | Habib et al. |
| 9,143,413 | B1 | 9/2015 | Manku et al. |
| 9,143,968 | B1 | 9/2015 | Manku et al. |
| 2005/0055568 | A1 | 3/2005 | Agrawala et al. |
| 2005/0083199 | A1 | 4/2005 | Hall et al. |
| 2008/0303655 | A1 | 12/2008 | Johnson |
| 2010/0315284 | A1 | 12/2010 | Trizna et al. |
| 2012/0146788 | A1 | 6/2012 | Wilson et al. |

(Continued)

FOREIGN PATENT DOCUMENTS

WO 2014/201574 12/2014

OTHER PUBLICATIONS

Non-Final Office Action received in U.S. Appl. No. 15/099,833, Jun. 27, 2016, 16 pages.

(Continued)

*Primary Examiner* — Daniel Lai
(74) *Attorney, Agent, or Firm* — Henry Patent Law Firm PLLC

(57) ABSTRACT

In a general aspect, motion of an object is detected based on wireless signals. In some aspects, a receiver in a space receives wireless signals; the wireless signals are based on transmissions of a reference signal by a transmitter. Each of the received wireless signals is based on a respective transmission of the reference signal at a distinct time. Channel responses are determined based on the received wireless signals and the reference signal. Each channel response is determined based on a respective one of the received wireless signals. Motion of an object in the space is detected based on the channel responses.

21 Claims, 6 Drawing Sheets

(56) References Cited

U.S. PATENT DOCUMENTS

| | | | |
|---|---|---|---|
| 2012/0184296 A1* | 7/2012 | Milosiu | H04B 17/318 455/456.1 |
| 2014/0004874 A1 | 1/2014 | Schwartz et al. | |
| 2014/0015706 A1 | 1/2014 | Ishihara et al. | |
| 2014/0140231 A1 | 5/2014 | Haiut et al. | |
| 2014/0247179 A1* | 9/2014 | Furuskog | G01S 13/003 342/28 |
| 2015/0212205 A1 | 7/2015 | Shpater | |
| 2015/0338507 A1 | 11/2015 | Oh et al. | |

OTHER PUBLICATIONS

Notice of Allowance received in U.S. Appl. No. 15/228,418, Oct. 12, 2016, 8 pages.

Notice of Allowance received in U.S. Appl. No. 15/099,833, Oct. 14, 2016, 10 pages.

\* cited by examiner

DETECTING MOTION BASED ON REFERENCE SIGNAL TRANSMISSIONS

BACKGROUND

The following description relates to detecting motion, for example, based on reference signal transmissions.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

In some aspects of what is described, motion of an object is detected based on wireless transmissions of a reference signal. The wireless transmissions can be, for example, electromagnetic signals that are wirelessly transmitted in the radio frequency (RF) spectrum or another frequency range. In some examples, wireless signals are transmitted in the ISM (Industrial, Scientific, and Medical) radio band or another RF band. In some implementations, a motion detector system includes a wireless transmitter, a wireless receiver, a wireless transceiver, or combinations of them. Motion detector systems may be used in larger systems, such as a security system, that may include a control center for monitoring movement within a space, such as a room, building, etc.

In some instances, when an object moves, the movement affects a communication channel through which wireless signals propagate, and the object's movement can be detected based on wireless signals propagated through all or part of the affected communication channel. For example, channel responses may be determined based on received wireless signals and a known reference signal, and the object's motion can be detected based on changes in the channel response over time. In some cases, based on channel variations in a radio propagation path, moving objects can be detected and the intensity of motion (e.g., size, speed) can be computed based on measurements of the radio channel.

In some cases, a motion detection system can reduce or eliminate the effects of noise and interference in a communication channel, for instance, by determining a quality metric for the channel responses, by identifying interference in a received signal, or by a combination of these and other techniques. In some implementations, a wireless signal may propagate through an object (e.g., a wall) before or after interacting with a moving object, which may allow the object's movement to be detected without an optical line-of-sight between the moving object and the sensor device.

In some cases, a motion detection system can operate in a radio environment that is also affected by other transmitters, for example, in the unlicensed or licensed radio bands. In some cases, the motion detection system can detect motion based on radio signals that overlap in frequency with signals generated by another system (e.g., Wi-Fi beacons, Bluetooth devices, etc.), or incursions can also happen out-of-band and still affect signals detected by the motion detection system (e.g., due to the non-idealities in measurement equipment, etc.). In some cases, a motion detection system can coexist with such other wireless transmitters, and operate to detect motion within spatial the range of the motion detection system's radio field. The motion detection system may allow for tuning a motion detection range, for example, based on the selection of channel metrics.

Figure 1:
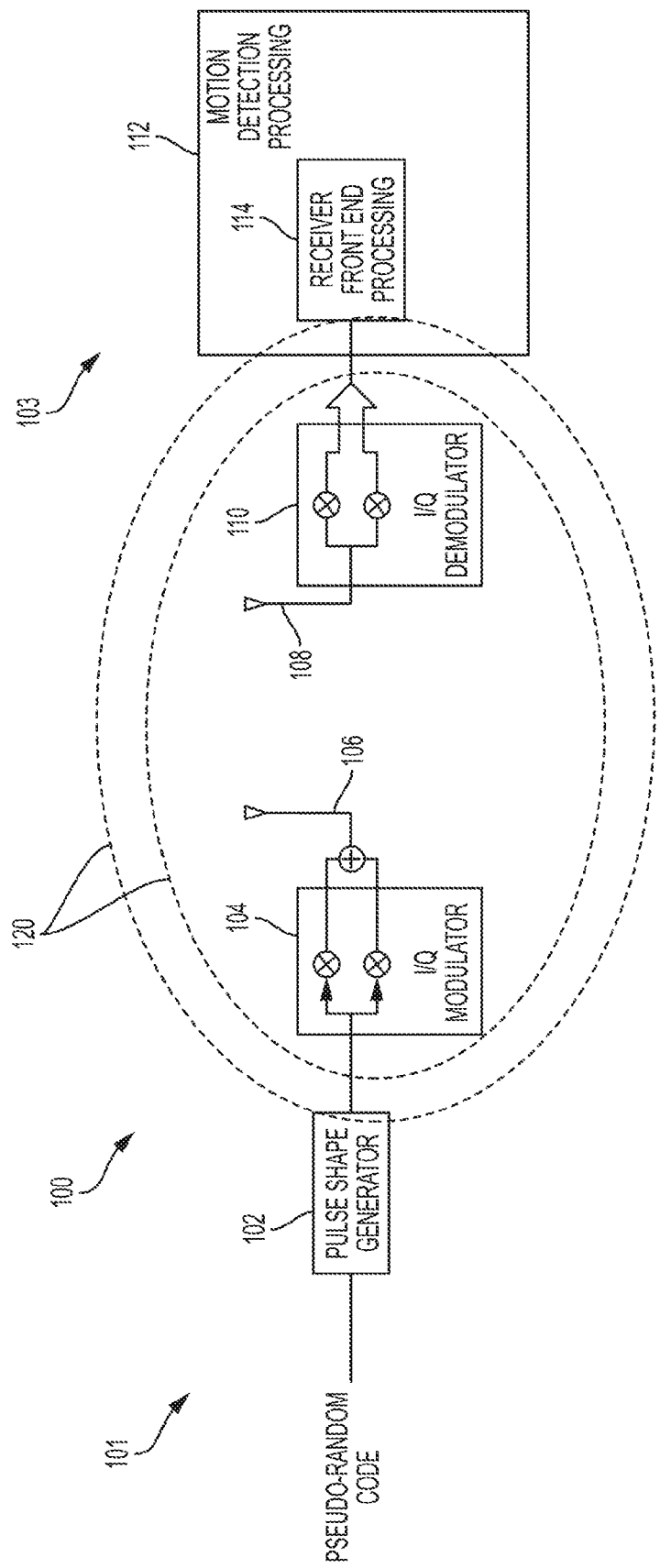
FIG. 1 is a diagram showing an environment with example motion detection system.

FIG. 1 is a diagram showing an environment with example motion detection system 100. The example motion detection system 100 includes a transmitter 101 and a receiver 103. The example transmitter 101 includes a pulse shape generator 102, in-phase (I) and quadrature (Q) modulation circuitry 104 and an antenna 106. The example receiver 103 includes an antenna 108, I/Q demodulation circuitry 110 and a motion detection data processing apparatus 112 with a receiver front end data processing apparatus 114. A motion detection system may include additional or different features, and the components may be configured to operate as described with respect to the example shown in FIG. 1 or in another manner.

The example transmitter 101 shown in FIG. 1 is a radio frequency transmitter device. In some aspects of operation, a reference signal is input into the pulse shape generator 102, and the output of the pulse shape generator 102 is input into the I/Q modulation circuitry 104 for up-converting to an RF signal. The RF signal is output from the I/Q modulation circuitry 104 and is converted to a wireless RF signal by the antenna 106, which transmits the wireless RF signal. In the example shown, the reference signal is a pseudo-random code, which may be obtained, for example, based on the output of a pseudo-random number generator or another type of system. In some cases, another type of reference signal can be used.

Figure 2:
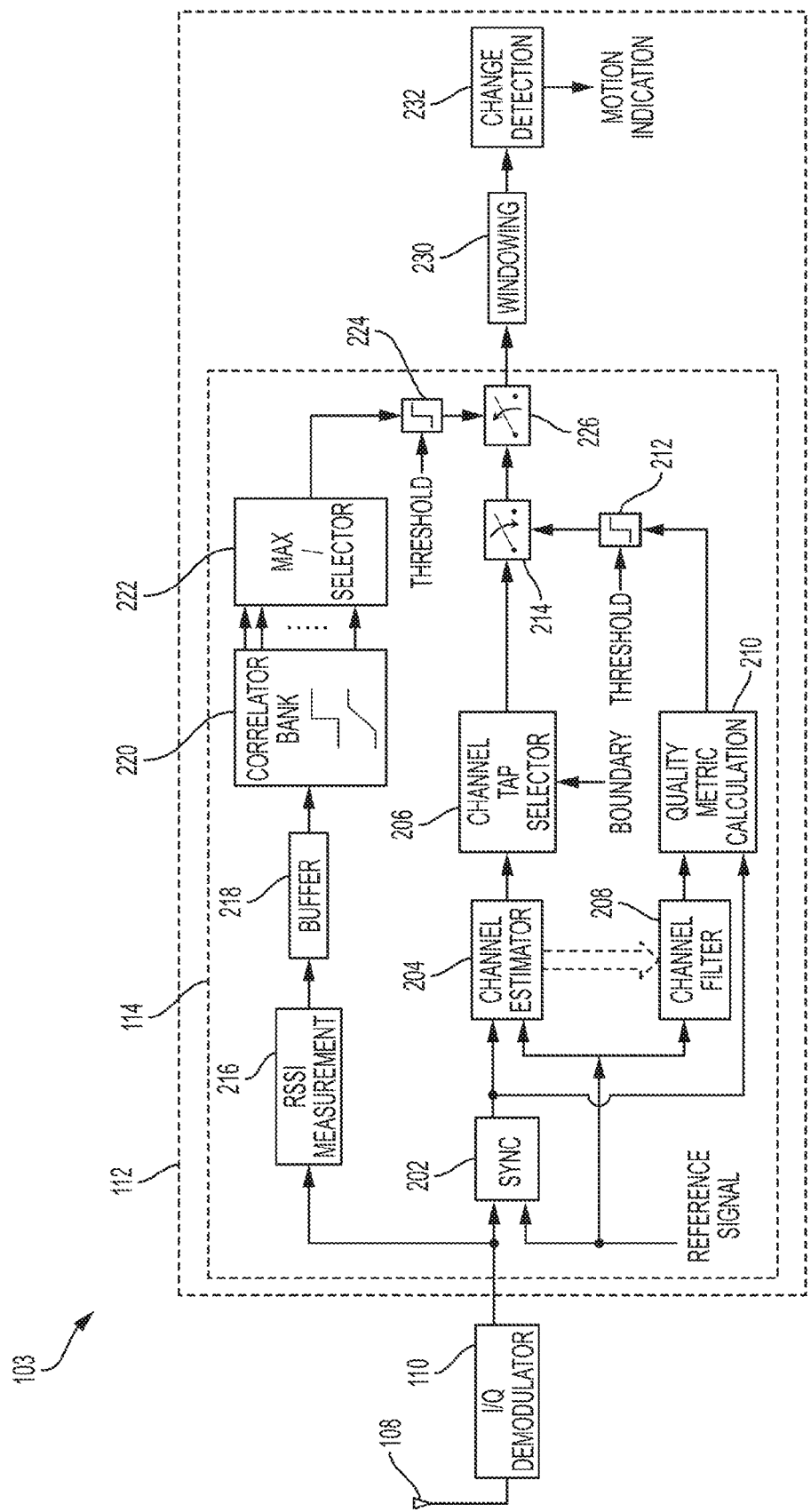
FIG. 2 is a diagram of an example receiver.

The example receiver 103 shown in FIG. 1 is a radio frequency (RF) wireless receiver device. In some aspects of operation, the antenna 108 receives a wireless RF signal that is input into the I/Q demodulation circuitry 110 to down-convert the RF signal. Complex numbers that form the down-converted signal are input into the motion detection data processing apparatus 112. An example motion detection data processing apparatus is shown in FIG. 2. In the example shown in FIG. 1, the pseudo-random code used to form the transmitted RF signal at the transmitter 101 is also known by the receiver 103. In some cases, the example motion detection system 100 uses a code division spread signal, and the spread spectrum signal is the pseudo-random code that has been modulated on an RF carrier.

As shown in FIG. 1, a motion detection field 120 resides in a space between and proximate the transmitter 101 and the receiver 103. In the example shown, the field 120 provides a wireless communication channel between the transmitter 101 and the receiver 103. In some aspects of operation, the receiver 103 receives wireless signals through a communication channel, and the received wireless signals are used to detect movement of an object (e.g., a person) in the wireless communication channel.

In some cases, a communication channel for a wireless signal can include, for example, air or another other medium through which the wireless signal propagates. A communication channel can include multiple paths for a transmitted wireless signal. For a given communication channel (or a given path in a communication channel), the transmitted signal can be reflected off or scattered by a surface in the communication channel. For instance, reflection or scattering may occur as a result of the transmitted signal being incident upon an impedance discontinuity, which may occur at a boundary between distinct materials, such as a boundary between air and a wall, a boundary between air and a person, or other boundaries. In some instances, when a transmitted signal becomes incident upon a boundary between a first material (e.g., air) and a second material (e.g., a wall), a portion of the transmitted signal can be reflected or scattered at the boundary. Additionally, another portion of the transmitted signal may continue to propagate through the second material, it may be refracted or affected in another manner. Further, the other portion that propagates through the second material may be incident upon another boundary, and a further portion may be reflected or scattered at that boundary and another portion may continue to propagate through the boundary.

In some cases, signals that propagate along the multiple paths of the communication channel can combine at a receiver to form a received signal. Each of the multiple paths can result in a signal along the respective path having an attenuation and a phase offset relative to the transmitted signal due to the path length, reflectance or scattering of the signal, or other factors. Hence, the received signal can have different components that have different attenuations and phase offsets relative to the transmitted signal. When an object that reflects or scatters a signal in a path moves, a component of the received signal at the sensor can change. For example, a path length can change resulting in a smaller or greater phase offset and resulting in more or less attenuation of the signal. Hence, the change caused by the movement of the object can be detected in the received signal.

In some cases, reflection, scattering or other effects on the transmitted signal in the communication channel can produce a channel response. In some cases, the channel response can be determined based on knowledge of the transmitted signal and the received signal. When an object moves in the communication channel, the effects on the transmitted signal in the communication channel change, and hence, the channel response of the communication channel can also change. Accordingly, a changed detected in the channel response can be indicative of movement of an object within the communication channel. In some instances, noise, interference or other phenomena can influence the channel response detected by the receiver, and the motion detection system can reduce or isolate such influences to improve the accuracy and quality of motion detection capabilities.

FIG. 2 is a diagram of an example implementation of the receiver 103 shown in FIG. 1. The receiver 103 shown in FIG. 1 may be implemented in another manner. As shown in FIG. 2, the example receiver 103 includes the motion detection data processing apparatus 112 with the receiver front end data processing apparatus 114.

The motion detection data processing apparatus 112 may be implemented as a system on a chip (SoC), for example. The motion detection data processing apparatus 112 may be included in the same device (e.g., in the same housing or assembly) as receiver circuitry including the antenna 108 and I/Q demodulation circuitry 110, or the motion detection data processing apparatus 112 may be remote from and communicatively coupled to the receiver circuitry such as through a network (e.g., local area network (LAN), wide area network (WAN), the Internet, the like, or a combination thereof) or another type of connection. In some implementations, the motion detection data processing apparatus 112 includes programmable logic (e.g., a field programmable gate array (FPGA) with a core instantiated thereon, or another type of programmable logic), a general purpose processor or digital signal processor (DSP), an application specific integrated circuit (ASIC) or the like, or a combination thereof, in addition to or in combination with the receiver front end data processing apparatus 114.

In some implementations, the receiver front end data processing apparatus 114 can be or include a vector processor or another type of processor. The receiver front end data processing apparatus 114 may include programmable logic, a general purpose processor or DSP configured to execute program code instructions to perform the functionality of FIG. 2, an ASIC or the like, or a combination thereof.

In some implementations, the receiver circuitry (e.g., the antenna 108, the I/Q demodulation circuitry 110, and possibly other receiver circuitry) is configured to receive wireless signals that are based on transmissions of a reference signal by a transmitter (e.g., the transmitter 101 shown in FIG. 1). Each of the received wireless signals are based on a respective transmission of the reference signal at a distinct time; in some instances, one or more of the received wireless signals includes noise, interference from other sources, signals based on other transmissions, etc. In the example shown in FIG. 2, the receiver circuitry outputs respective received wireless signals to the receiver front end data processing apparatus 114, which is configured to determine channel responses based on the received wireless signals and the reference signal, where each channel response is determined based on a respective one of the received wireless signals. The motion detection data processing apparatus 112 is configured to detect motion (e.g., of an object in the field 120 shown in FIG. 1) based on the channel responses.

As shown in FIG. 2, the receiver front end data processing apparatus 114 includes three signal processing paths. A first path, which operates as a channel response determination path, includes a channel estimator 204 and a channel tap selector 206. A second path, which operates as a quality metric determination path, includes a channel filter 208 and a quality metric calculation unit 210. A third path, which operates as an interference determination path, includes a Received Signal Strength Indication (RSSI) measurement unit 216, a buffer 218, a correlator bank 220, and a maximum selector 222. The receiver front end data processing apparatus 114 may include additional or different signal processing paths, each of the paths may include additional or different features, and the components of a path may be configured to operate as described with respect to FIG. 2 or in another manner.

In some implementations, the first path can provide direct motion detection, and the second and third paths can apply non-linear filters to the detection metrics. For instance, the non-linear filters may operate to sanitize motion detection data, eliminate false alarms due to other RF signals in the environment or perform a combination of these and other processes to complement the motion detection strategy. In some cases, the motion detection process depends on the radio signal energy received by the receiver. For instance, if a significant change in received energy is detected at different delay lags, motion detection can be triggered at ranges corresponding to those delay lags. The receiver may be sensitive to the received signal energy. For instance, if the motion detection uses wireless signals in the ISM band, significant bursts of energy both within and outside the channel bandwidth from other RF sources may occur. In some implementations, the three parallel paths in the example shown in FIG. 2 can operate to prevent such energy bursts from skewing motion detection In the example shown in FIG. 2, a received signal (e.g., a complex signal) is output from the I/Q demodulation circuitry 110 and is input to the RSSI measurement unit 216 and to a synchronization unit 202. The reference signal, which can be a stored copy of the pseudo-random code obtained at the transmitter 101, is also input into the synchronization unit 202. The synchronization unit 202 brings the received signal into sync (e.g., into phase) with the reference signal and outputs the synced received signal.

In some aspects of operation, in the channel response determination path, the synced received signal from the synchronization unit 202 and the reference signal are input into the channel estimator 204. The channel estimator 204, using the synced received signal and the reference signal, determines the channel response of the communication channel. The channel response ($h_{ch}$) can be determined, for example, based on the mathematical theory of estimation. For instance, the reference signal ($R_{ef}$) can be modified with candidate channels ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the channel estimates ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k) h_{ch}(k)$$

with the optimization criterion $$\min_{h_{ch}} \Sigma (\hat{R}_{cvd} - R_{cvd})^2.$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

As shown in FIG. 2, the channel response determined by the channel estimator 204 is input into the channel tap selector 206. A boundary (e.g., a user-defined boundary, a calculated boundary, or another type of boundary) is also input into the channel tap selector 206. The channel tap selector 206 identifies which channel coefficients will be selected and passed on for further analysis. In the example shown, the boundary defines a range from the selected tap in which the channel coefficients will be passed; other channel coefficients outside of the range are not passed for further processing. The selected channel coefficients in the range are passed to a first switch 214, which is controlled by an output of the quality metric determination path. The output of the first switch 214 is input into an input of a second switch 226, which is controlled by an output of the interference determination path. The output of the second switch 226 is input into a windowing unit 230.

In some aspects of operation, in the quality metric determination path, the reference signal is input into a channel filter 208. The channel filter 208 receives the channel response ($h_{ch}$) determined by the channel estimator 204 and applies the channel response ($h_{ch}$) to the reference signal. The reference signal ($R_{ef}$) is passed through the channel filter 208, and the channel filter 208 outputs an estimated received signal ($\vec{R}_{cvd}$), which is an estimation of what the received signal should be based on the channel response, e.g., based on convolution of the reference signal ($R_{ef}$) with the channel response ($h_{ch}$) as described above. The estimated received signal ($\vec{R}_{cvd}$) and the synced received signal ($R_{cvd}$) are input into the quality metric calculation unit 210, where a quality calculation is performed on the signals. In some examples, the quality calculation includes computing the dot product of the synced received signal ($R_{cvd}$) and the difference between the estimated received signal ($\vec{R}_{cvd}$) and the synced received signal ($R_{cvd}$), e.g.:

$$R_{cvd} \cdot (\hat{R}_{cvd} - R_{cvd}).$$

Another quality calculation may be used in some cases. In some examples, the absolute value or magnitude of the dot product or another computed value is used as a quality metric for the channel response. In some cases, the quality metric is a correlation index, or another type of quality metric.

In some implementations, the quality metric calculation can generate a particular value of the quality metric, e.g., a correlation index, or another type of quality metric, that is output from the quality metric calculation unit 210 to a thresholding unit 212. A threshold value is also input into the thresholding unit 212. Based on a comparison of the threshold value and the value of the quality metric, the thresholding unit 212 can output an indication to the first switch 214 to open or close. For instance, if a correlation index exceeds the threshold value, the first switch 214 can be closed. In some cases, when the calculated value of the quality metric exceeds the threshold value, the estimated received signal is sufficiently correlated to the synced received signal to provide a reliable basis for motion detection. By performing this quality calculation, in some instances, channel responses that are based on received signals with significant noise or interference present can be blocked from indicating motion in subsequent processing.

In some aspects of operation, in the interference determination path, the received signal is input into the RSSI measurement unit 216, which outputs a received signal strength to the buffer 218. From the buffer 218, the received signal strength is input to the correlator bank 220. In the example shown, the correlator bank 220 correlates the received signal strength with known pulses of sharp slew rates, which may generally be indicative of interference. Respective correlation indications are output from the correlator bank 220 to the maximum selector 222, and the maximum selector 222 determines which correlation indication is the highest. This highest correlation indication is output from the maximum selector 222 to a threshold unit 224; the threshold unit 224 also receives a threshold value. Based on a comparison of the threshold value and the highest correlation index, the threshold unit 224 can output an indication to the second switch 226 to open or close. For instance, if the highest correlation index exceeds the threshold value, the threshold unit 224 can close the second switch 226. By correlating the received signal to the known pulses, in some instances, received signals that have a high correlation to known interference patterns, such as with a communication burst in an adjacent band, a sudden change in front-end receiver gain changes, etc., can be identified, and channel responses based on those received signals can be blocked from indicating motion in subsequent processing.

In the example shown in FIG. 2, when the first switch 214 and the second switch 226 are closed, the selected channel coefficients (in the range specified by the boundary) are passed to the windowing unit 230. The windowing unit 230 can be a buffer, for example, that is set to store a number of samples of the selected channel coefficients, where the samples are based on transmissions of the reference signal at distinct times. A number of samples may be stored and used for motion detection. From the samples that are stored in the windowing unit 230, the change detection unit 232 can determine when a statistically significant change occurs in the samples to output a motion indication. In the example shown, the motion indication indicates when motion has been detected based on the samples of the selected channel responses. In some examples, the change detection determines a standard deviation for one or more channel coefficients (or for a range of channel coefficients) across the samples, and when at least one of the standard deviations exceeds a threshold value, the change detection unit 232 outputs a motion indication.

Figure 3:
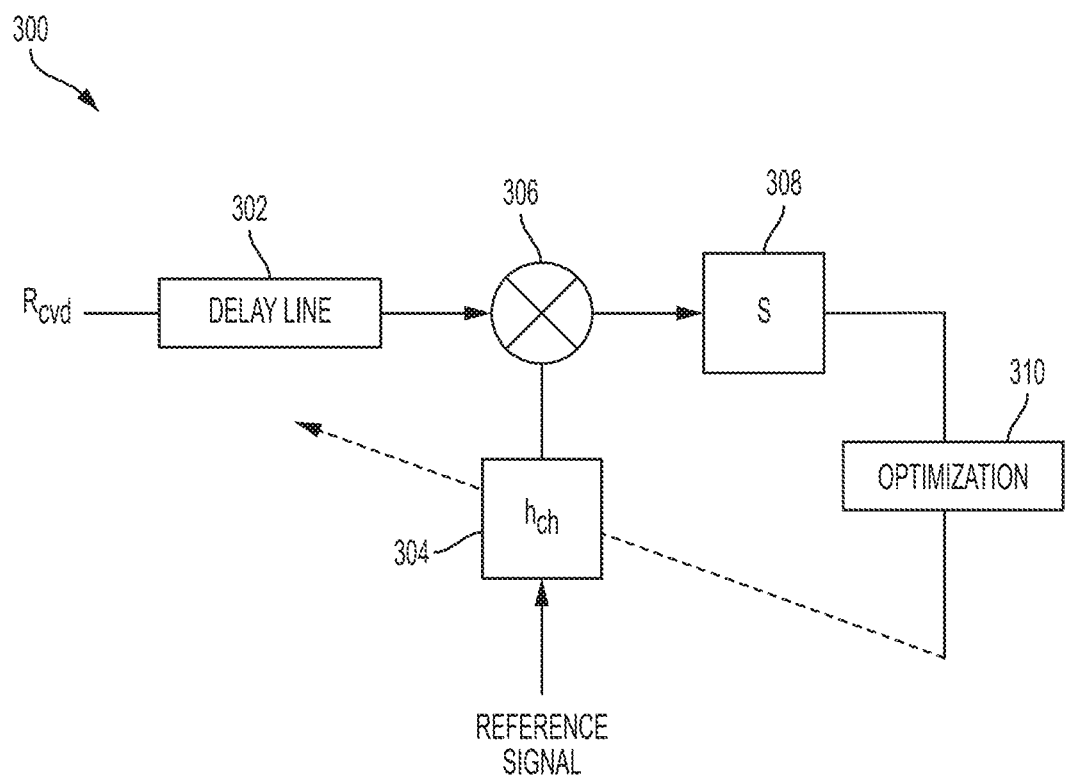
FIG. 3 is a diagram of an example channel estimator.

FIG. 3 is a diagram of an example channel estimator 300. In some cases, the example channel estimator 300 can be used to implement the channel estimator 204 shown in FIG. 2. As shown in FIG. 3, a received signal ($R_{cvd}$) is input into a delay line 302, and the reference signal ($R_{ef}$) is input to an adaptive filter 304. The outputs of the delay line 302 and the adaptive filter 304 are correlated by a multiplier 306 and a correlation unit 308. The output of the correlation unit 308 is provided to an optimization unit 310, which optimizes the channel coefficients of the channel response to minimize an error in the correlation between the two signals. In some cases, once the optimization process is complete, the received signal lands at different points in the power delay profile, based on reflections encountered in the environment. This can be shown by discrete pulses in the channel response. The channel coefficients are returned to the adaptive filter 304. The optimization unit 310 may implement any adaptive filtering technique, such as LMS, RLS, BLS, etc. In some cases, a channel estimator may include additional or different features, and the components may operate as shown or in another manner.

Figure 4A:
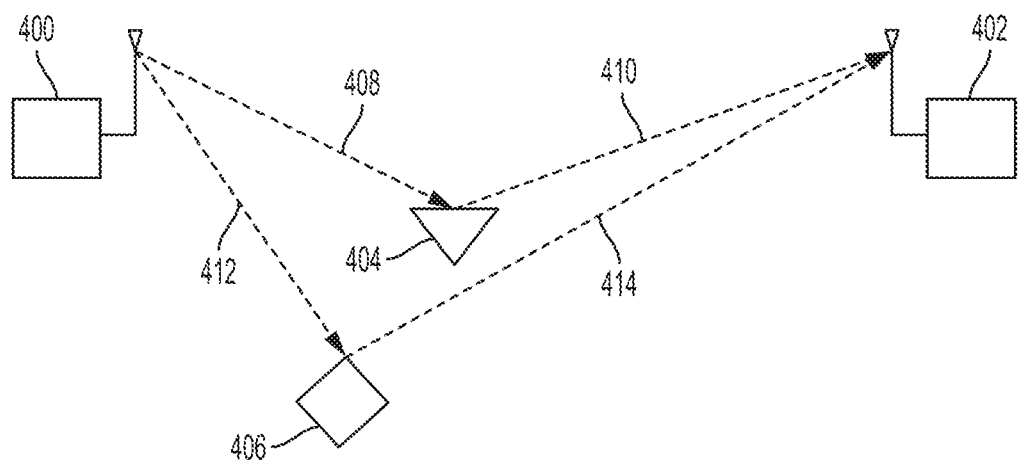
FIGS. 4A and 4B are diagrams showing aspects of an example motion detection process.
Figure 4B:
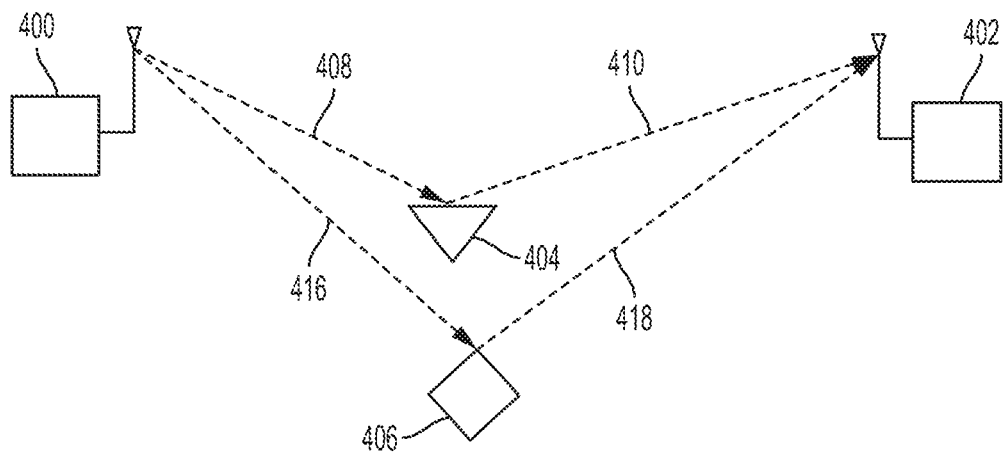

FIGS. 4A and 4B are diagrams showing an example of motion detection. As shown in FIGS. 4A and 4B, a transmitter 400 transmits signals that are received by a receiver 402. In some cases, the transmitter 400 and receiver 402 are implemented as the example transmitter 101 and receiver 103 shown in FIG. 1. In the example shown, the transmitter 400 and the receiver 402 reside in a space with two objects 404, 406. The space can be completely or partially enclosed or open at one or more boundaries of the space. The space can be or can include, in some examples, a single room, multiple rooms, a building, or the like.

As shown in FIGS. 4A and 4B, wireless signals from the transmitter 400 are reflected off the objects 404, 406 and received at the receiver 402. The objects 404, 406 can be any type of static or moveable object, and can be living or inanimate. For example, either of the objects can be a person, an animal, an inorganic object (e.g., a system, device, apparatus or assembly), an object that defines all or part of the boundary of a space (e.g., a wall, door, window, etc.), or another type of object.

FIG. 4A shows the objects 404, 406 in their respective positions at an initial time, and FIG. 4B shows the objects 404, 406 in their respective positions at a later time. In the example shown, the first object 404 is static, as it remains in the same position and same orientation at both times shown. A first signal path having a first segment 408 from the transmitter 400 to the first object 404 and a second segment 410 reflected from the first object 404 to the receiver 402 is shown. Also in the example shown, the second object 406 moves; in particular, the position of the second object 406 has changed from the initial time (in FIG. 4A) and the later time (in FIG. 4B).

In FIG. 4A at a first time $t_1$, a second signal path having a third segment 412 from the transmitter 400 to the second object 406 and a fourth segment 414 reflected from the second object 406 to the receiver 402 is shown. In FIG. 4B at a second time $t_2$ after the second object 406 has moved, a third signal path having a fifth segment 416 from the transmitter 400 to the second object 406 and a sixth segment 418 reflected from the second object 406 to the receiver 402 is shown. Additional or different signal paths may be present, which may include one or more other reflections, etc.

In FIG. 4A, the channel response corresponds to reflectors in the environment, and the first signal path and the second signal path each cause a spike in the channel response corresponding to a respective delay associated with the signal path. For example, since the second signal path is longer than the first signal path, the spikes associated with the first and second signal paths will occur at different points in the channel response. In FIG. 4B, once the second object 406 has moved, the third signal path may be shorter than the second signal path. Hence, the spike associated with the third signal path may move with respect to the spike associated with the first signal path. This and other types of changes in the channel response can be detected (e.g., by the change detection unit 232 or another device), and motion can be indicated as a result. In some types of environments (e.g., indoors), there are reflections from the boundary walls and many other reflections may be present. In some instances, the motion detection system can zoom into a particular range of reflections of interest, and monitor any changes in their profile.

Figure 5:
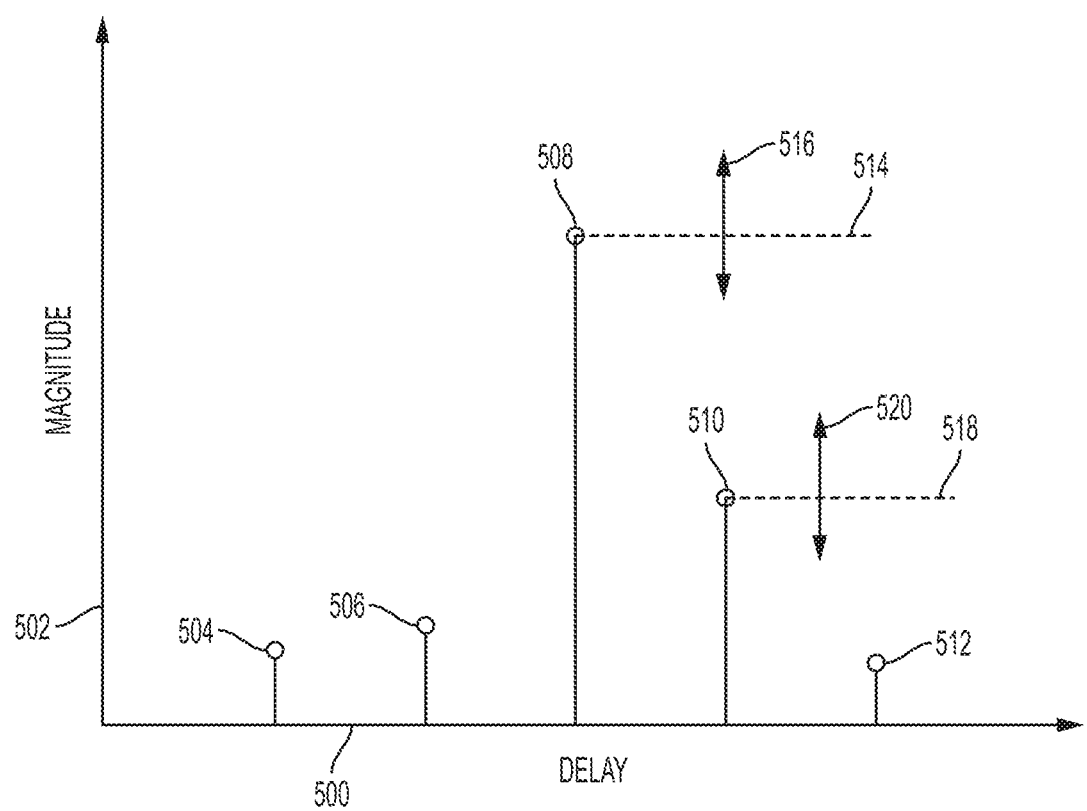
FIG. 5 is a plot showing an example of an averaged channel response.

FIG. 5 is a plot showing an example of an averaged channel response. The averaged channel response shown in FIG. 5 is based on multiple samples of channel responses. The x-axis 500 shown in FIG. 5 represents the delay in the channel response, and the y-axis 502 shown in FIG. 5 represent the magnitude of the channel response. Examples of average channel coefficients 504, 506, 508, 510 and 512 are shown. At each of the average channel coefficients 508 and 510, a mean line 514 and 518 is shown with a variance 516 and 520, respectively. The variances 516 and 520 indicate differences among the individual samples that were averaged; the differences may be caused, for example, by noise, interference or changes in one or more paths (e.g., movement of an object). In some cases, when the variance exceeds a threshold, motion may be detected. In some cases, the variance can be computed as the standard deviation or another statistical indicator of variance.

Figure 6:
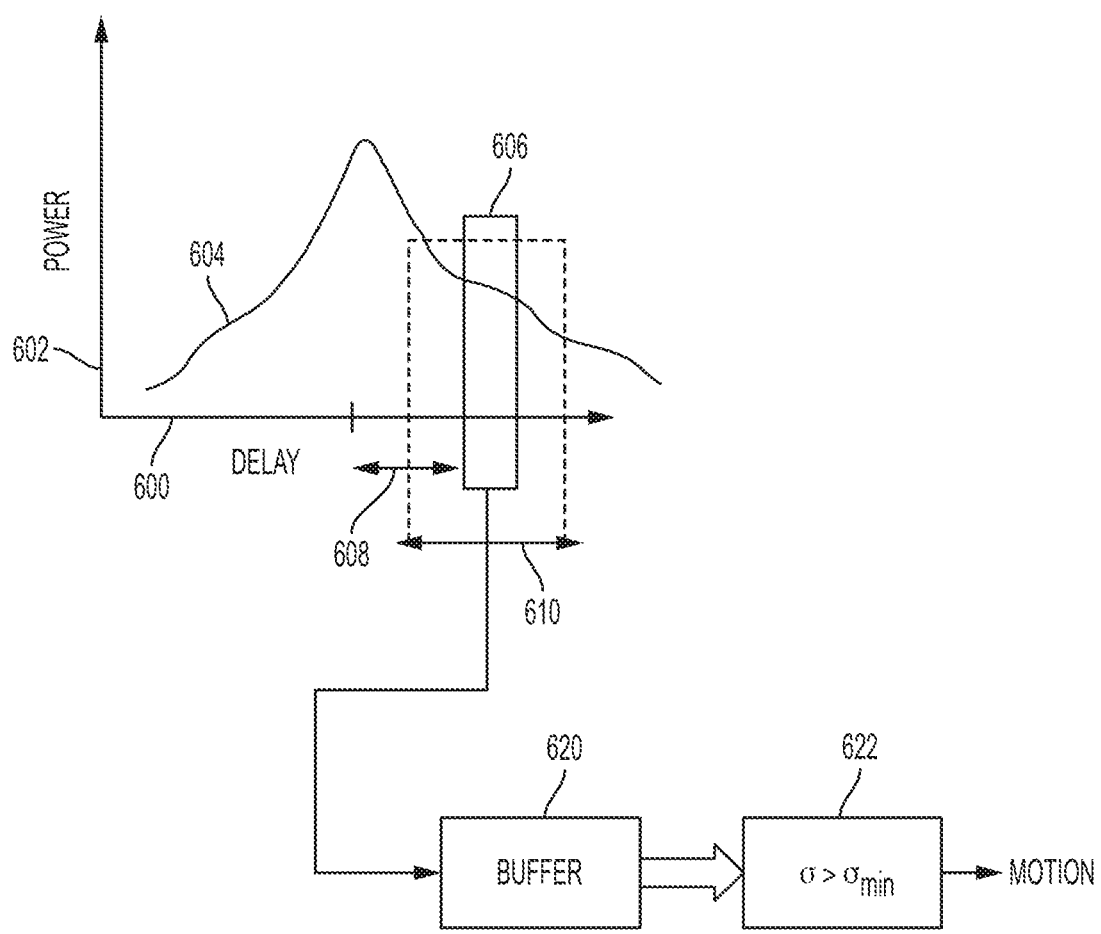
FIG. 6 is a diagram showing an example process for detecting motion.

FIG. 6 is a diagram showing aspects of an example process for detecting motion. The diagram in FIG. 6 includes a plot of an example channel response. The plot includes an x-axis 600, which represents a range of delay values, and a y-axis 602, which represents a range of the power values for the channel response. The curve 604 represents an example channel response based on a hypothetical reference signal and received wireless signal. In the example shown, the curve 604 representing the channel response is composed of discrete points (e.g., as shown in FIG. 5) representing individual channel coefficients, and the time between the points is sufficiently small that the channel response can be treated as a continuous function for some purposes.

In some cases, the channel response represented in FIG. 6 can be used to analyze one or more signal paths for processing to determine when movement occurs. In FIG. 6, the range 606 highlighted in the plot represents an example signal path that can be analyzed. For instance, the power in the designated range 606 can be integrated (e.g., to obtain a total energy in the range 606), and the channel response within the range or the result of the integration (or both) can be stored in a buffer 620 as a sample. Multiple samples associated with distinct transmissions at distinct times can be stored in the buffer 620, and the buffer 620 can have a depth that allows a number (e.g., tens, hundreds, thousands, etc.) of samples to be stored. The number of samples stored in the buffer 620 may depend on the storage capacity of the buffer 620, the size of each sample and possibly other factors. The size of each sample may depend on the size of the window being analyzed, for example, as determined by the windowing unit 230 in FIG. 2.

In the example shown in FIG. 6, samples from the buffer 620 are input to a change detection unit 622, where a standard deviation of the samples is determined. The change detection unit 622 can be, for example, the change detection unit 232 in FIG. 2 or another type of change detection unit. In some implementations, the change detection unit 622 may compute the variance of the samples in another manner. If the determined variance (e.g., the standard deviation) exceeds a minimum threshold value, a motion indication is output from the change detection unit 622. By using a minimum threshold variance, in some cases, the system may be more robust against noise and may avoid false motion indications that may occur due to noise.

As further shown in FIG. 6, the range 606 can be adjusted (translated horizontally along the x-axis, as shown at 608) to other portions of the channel response, and the range 606 can be resized (made wider or narrower along the x-axis, as shown at 610) to include more or less of the channel response. By adjusting the range 606, different signal paths may be analyzed. For example, in some cases, the closer the range 606 is to the center of mass of the channel response, movement nearer to the receiver can be detected, and the further the range 606 is from the center of mass of the channel response, movement farther from the receiver can be detected. The width of the range 606 can be increased or decreased to include analysis of a different number (more or fewer) signal paths. The width and location of the range 606 can be specified, for example, by one or more inputs into a channel tap selector (e.g., the boundary input to the channel tap selector 206 in FIG. 2), one or more input to back-end data processing, or a combination thereof. In some instances, multiple ranges may be analyzed, for example, in parallel. Using multiple ranges may allow for detecting movement over a larger space, may allow for a greater level of sensitivity or may provide a combination of these and other advantages in some cases.

In some aspects of the examples described here, a receiver receives wireless signals that are based on multiple transmissions of a reference signal, and each of the received wireless signals is based on a respective transmission of the reference signal at a distinct time. For instance, in the case of the transmitter 101 of FIG. 1 being incorporated as the transmitter 400 of FIGS. 4A and 4B, and the receiver 103 of FIGS. 1 and 2 being incorporated as the receiver 402 of FIGS. 4A and 4B, the transmitter 400 may transmit the reference signal ($R_{ef}$) as a wireless signal at times $t_1$, $t_2$, . . . . $t_6$. In this example, the receiver 402 can receive wireless signals ($R_{cvd}$) at times $t_1+\phi$, $t_2+\phi$, . . . $t_6+\phi$, where $\phi$ accounts for a time duration of the wireless signal propagating from the transmitter 400 to the receiver 402.

In some aspects of the examples described here, channel responses are determined based on the received wireless signals and the reference signal, and each channel response is determined based on a respective one of the received wireless signals. Continuing the example from above, for each of the transmission times $t_1$, $t_2$, . . . $t_6$, the received signal ($R_{cvd}$), e.g., after down-conversion, filtering, etc., can be brought into sync with the reference signal ($R_{ef}$) stored on the receiver 402, such as by a synchronization unit 202. The synced received signal, e.g., output from the synchronization unit 202, is used along with the reference signal ($R_{ef}$) to determine a channel response ($h_{ch}$), such as by the channel estimator 204. The channel response, e.g., output from the channel estimator 204, is filtered, such as by a channel tap selector 206, to allow a range of channel coefficients to pass for further processing.

In some aspects of the examples described here, channel responses can be analyzed for motion in the communication channel traversed by the wireless signals. In the example above, if the objects 404, 406 do not move between time $t_1$ and time $t_6$, the receiver 103 may receive the same wireless signal ($R_{cvd}$) based on each transmission. In the example shown in FIG. 4A, the communication channel includes the first signal path (including segments 408 and 410) and the second signal path (including segments 412 and 414). Hence, the channel response includes effects from the reflections of the wireless signal off the objects 404, 406, and the channel response may change when either of the objects 404, 406 move.

In some aspects of the examples described here, a quality metric is used to determine whether to analyze a channel response for motion detection. For example, a quality metric based on a comparison of the synced received signal and an estimated received signal may be compared to a threshold value. In some instances, the channel response ($h_{ch}$) can be used with the reference signal ($R_{ef}$) to determine the estimated received signal ($\hat{R}_{cvd}$). For example, the channel response ($h_{ch}$) may be implemented on a channel filter 208 through which the reference signal ($R_{ef}$) is passed to obtain the estimated received signal ($\hat{R}_{cvd}$), or mathematically, the reference signal ($R_{ef}$) is convoluted with the estimated channel response ($h_{ch}$) to determine the estimated received signal ($\hat{R}_{cvd}$). The synced received signal ($R_{cvd}$) and the estimated received signal are then used to determine the quality metric, such as by using the quality metric calculation unit 210. In some examples, the quality metric is the dot product of the synced received signal ($R_{cvd}$) with the difference of the estimated received signal ($\hat{R}_{cvd}$) and the synced received signal ($R_{cvd}$), e.g.:

$$R_{cvd} \cdot (\hat{R}_{cvd} - R_{cvd}).$$

Another quality metric may be used in some cases.

In some aspects of the examples described here, interference detection is used to determine whether to analyze a channel response for motion detection. For example, whether the received wireless signal includes a signal indicative of interference can be determined by the receiver. In some cases, signal profiles that match known interference patterns can be indicative of interference. The received signal ($R_{cvd}$) can be measured to determine a signal strength, such as by the RSSI measurement unit 216. The signal strength may be stored in a buffer, e.g., the buffer 218, and the signal strength can be correlated to profiles of signals that are indicative of interference, e.g., by the correlator bank 220. For example, the signal that are indicative of interference may include signals having a high slew rate or other properties. The highest correlation value can be selected, such as by the maximum selector 222.

In some cases, but the quality metric and interference detection are used. For instance, if the quality metric is sufficiently high (e.g., as determined by the thresholding unit 212) and the highest correlation is sufficiently low (e.g., as determined by the thresholding unit 224), the range of the channel coefficients of the channel response can be passed, such as through switches 214 and 226 controlled by the threshold units 212 and 224, respectively, for windowing or other analysis.

In some aspects of the examples described here, each of the channel responses can be integrated to determine a total energy of the channel response within a specified range, and the results of the integration can be stored for a predetermined number of samples. As an example, if the number of samples to be stored is four, after the transmission at time $t_6$, the energies of the channel response within the range are stored in the buffer for transmissions at times $t_6$, $t_5$, $t_4$, and $t_3$ (e.g., in the event that the data for each of the transmissions has a sufficiently high quality metric and sufficiently low interference correlation). If the data for the transmission at time $t_3$ had a low quality metric or high interference correlation, for example, the energy for the channel response for the transmission at time $t_3$ may not be passed (such as by one or both of the switches 214 and 226 being open), and the energies of the channel responses within the range that are stored in the buffer are for transmissions at times $t_6$, $t_5$, $t_4$, and $t_2$.

In some aspects of the examples described here, data from the channel responses are used to compute a standard deviation. In the event that no movement has occurred, the standard deviation may include noise, which should cause the standard deviation to be below a threshold and not provide an indication of movement. In the event that movement occurs, for example, at time $t_7$, the motion may be detected by the receiver. For instance, in the example shown in FIG. 4B, the second object 406 moves. As shown, the transmitter 400 transmits the reference signal ($R_{ef}$) as a wireless signal, and the receiver 402 receives the wireless signal ($R_{cvd}$), which is analyzed to determine a channel response as discussed above with respect to preceding signals. In this example, the communication channel includes the first signal path (including segments 408 and 410) and the third signal path (including segments 416 and 418). Hence, the channel response includes effects resulting from the reflections of the wireless signal off the objects 404, 406, and the communication channel was altered by the movement of the second object 406.

Continuing the example from above, the buffer includes three samples of the communication channel as shown in FIG. 4A from the transmissions at times $t_6$, $t_5$, and $t_4$ and one sample of the communication channel as shown in FIG. 4B from the transmission at time $t_7$. The energies that are stored as samples are then used to determine a standard deviation. With the sample from the transmission at time $t_7$, the standard deviation that is determined may increase to an amount that exceeds the threshold value, and if so, a motion indication is output indicating, e.g., movement of the second object 406. The motion indication may then be transmitted, e.g., to a controller at a control center of a security system. The transmission may be through a network that includes wireless or wired connections (or both). Once the motion indication is received at the control center, an alert may be sent to authorities, such as police, who may then be dispatched to the location of the receiver to inspect the occurrence that triggered the motion indication.

In some implementations, the distance between objects can be resolved based on the channel responses. In some instances, a minimum distance between objects that can be resolved the channel response is given by the speed of the wireless signal multiplied by the time between transmissions. As such, the resolvable distance can be a function of the type of signal transmitted by the transmitter. A higher rate signal can reduce the resolvable distance. As an example, for a signal transmission rate of 20 MHz, the resolvable distance may be 15 m. In some implementations, the motion detection system is configured to monitor a certain area, and a boundary control mechanism can be used to adjust the boundary within a distance. The boundary may be determined through calibration in a particular environment. In some cases, the boundary contour is not fixed but is a function of indoor multipath.

In a general aspect of some of the examples described, wireless signals are used to detect movement in a space.

A first example is a motion detection process. A receiver in a space receives wireless signals based on transmissions of a reference signal by a transmitter. Each of the received wireless signals is based on a respective transmission of the reference signal at a distinct time. Channel responses are determined based on the received wireless signals and the reference signal. Each channel response is determined based on a respective one of the received wireless signals. Motion of an object in the space is detected based on the channel responses.

Implementations of the first example may, in some cases, include one or more of the following features. Estimated received signals may be generated based on the reference signal and the channel responses. Respective quality metrics may be determined based on the estimated received signals and the received wireless signals. In response to detecting that the quality metrics satisfy a quality criterion, motion may be detected based on the wireless signals. Detecting that the quality metrics satisfy the quality criterion may include detecting that the quality metrics exceed a threshold value. Correlation indicators may be determined by correlating respective signal strengths of the received wireless signals to a stored signal representing an interference pattern. In response to detecting that the correlation indicators satisfy a criterion, motion may be detected based on the channel responses. Detecting that the correlation indicators satisfy a criterion may include detecting that the maximum one of the correlation indicators is below a threshold value. Detecting the motion may include identifying a variance of the channel responses, and detecting motion based on the variance exceeding a threshold. The variance may be identified based on a portion of the channel responses in a sample window.

A second example is a motion detection system. The motion detection system includes receiver circuitry and a data processing apparatus. The receiver circuitry is configured to receive wireless signals. The wireless signals are based on transmissions of a reference signal over time by a transmitter, and each of the received wireless signals is based on a respective transmission of the reference signal at a distinct time. The data processing apparatus is coupled to the receiver circuitry. The data processing apparatus is configured to determine channel responses based on the received wireless signals and the reference signal, and to detect motion of an object in a space based on the channel responses. Each channel response is determined based on a respective one of the received wireless signals.

Implementations of the second example may, in some cases, include one or more of the following features. The data processing apparatus may be configured to determine respective correlation indices based on the received wireless signals and a stored signal representing an interference pattern. The data processing apparatus may be configured to detect motion based on a respective channel response when the respective correlation index of the respective received wireless signal is below a threshold value. The data processing apparatus may be configured to: determine estimated received wireless signals based on the channel responses and the reference signal; and determine quality metrics based on a comparison between the estimated received wireless signals and the received wireless signals. The data processing apparatus may be configured to detect motion based on a respective channel response when the respective quality metric of the respective channel response exceeds a threshold value. The data processing apparatus may be configured to detect motion based on a defined range of each channel response. The data processing apparatus may be configured to store a number of samples. The samples may be based on the channel responses, and the motion detection may be based on the samples. The motion detection can include: determining a variance based on the channel responses, and identifying when the motion occurs based on the variance exceeding a threshold value.

A third example is a motion detection method. Wireless signals are received at a receiver from a communication channel. Each wireless signal is based on a respective transmission of a reference signal by a transmitter. For each wireless signal, a channel response can be determined based on the wireless signal; whether the wireless signal includes a signal indicative of interference can be determined; whether a quality metric that is based on a comparison of the wireless signal and an estimated received signal exceeds a first threshold value can be determined, where the estimated received signal is based on the reference signal and the channel response; and at least a portion of the channel response can be passed when (i) the wireless signal is determined to not include a signal indicative of interference and (ii) the quality metric exceeds the first threshold value. Motion of an object in the communication channel can be detected when a variance based passed channel responses exceeds a second threshold value.

Implementations of the third example may, in some cases, include one or more of the following features. The passing at least the portion of the channel response can include passing a defined range of the channel response. Respective energies of the passed channel responses may be determined. A defined number of the respective energies may be stored. The variance of the energies that are stored may be determined. The determining whether the wireless signal includes a signal indicative of interference may include: determining respective correlation indices by correlating a signal strength of the wireless signal to signal profiles indicative of interference; and identifying one of the correlation indices that has a highest correlation between the signal strength and a respective one of the signal profiles. The determining whether the quality metric exceeds the first threshold value can include: passing the reference signal through a channel filter having the channel response to obtain the estimated received signal; and determining the quality metric by determining a dot product of the wireless signal and a difference of the estimated received signal and the wireless signal.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination. A number of embodiments have been described. Nevertheless, it will be understood that various modifications can be made. Accordingly, other embodiments are within the scope of the following claims.

What is claimed is:

1. A motion detection method comprising:
   at a receiver in a space, receiving wireless signals based on transmissions of a reference signal by a transmitter, each of the received wireless signals based on a respective transmission of the reference signal at a distinct time;
   determining, by operation of one or more processors, channel responses based on the received wireless signals and the reference signal, each channel response being determined based on a respective one of the received wireless signals;
   generating estimated received signals based on the reference signal and the channel responses; and
   detecting, by operation of the one or more processors, motion of an object in the space based on the channel responses and the estimated received signals.

2. The motion detection method of claim 1, wherein detecting the motion based on the channel responses and the estimated received signals comprises:
   determining respective quality metrics based on the estimated received signals and the received wireless signals; and
   in response to detecting that the quality metrics satisfy a quality criterion, detecting the motion based on the channel responses.

3. The motion detection method of claim 2, wherein detecting that the quality metrics satisfy the quality criterion comprises detecting that the quality metrics exceed a threshold value.

4. The motion detection method of claim 1, wherein detecting the motion comprises:
   identifying a variances based on the channel responses; and
   detecting motion based on the variance exceeding a threshold.

5. The motion detection method of claim 4, wherein the variances are identified based on a portion of each channel response in a sample window.

6. A motion detection method, comprising:
   at a receiver in a space, receiving wireless signals based on transmissions of a reference signal by a transmitter, each of the received wireless signals based on a respective transmission of the reference signal at a distinct time;
   determining, by operation of one or more processors, channel responses based on the received wireless signals and the reference signal, each channel response being determined based on a respective one of the received wireless signals;

determining correlation indicators by correlating respective signal strengths of the received wireless signals to a stored signal representing an interference pattern; and in response to detecting that the correlation indicators satisfy a criterion, detecting motion based on the channel responses.

7. The motion detection method of claim 6, wherein detecting that the correlation indicators satisfy a criterion comprises detecting that the maximum one of the correlation indicators is below a threshold value.

8. A motion detection system comprising:
receiver circuitry configured to receive wireless signals, the wireless signals being based on transmissions of a reference signal by a transmitter, each of the received wireless signals being based on a respective transmission of the reference signal at a distinct time; and
a data processing apparatus coupled to the receiver circuitry and configured to:
  determine channel responses based on the received wireless signals and the reference signal, each channel response being determined based on a respective one of the received wireless signals;
  determine estimated received wireless signals based on the channel responses and the reference signal; and
  detect motion of an object in a space based on the channel responses and the estimated received wireless signals.

9. The motion detection system of claim 8, wherein the data processing apparatus is configured to:
determine quality metrics based on comparisons between the estimated received wireless signals and the actual received wireless signals.

10. The motion detection system of claim 9, wherein the data processing apparatus is configured to detect motion based on a respective channel response when the quality metric of the respective channel response exceeds a threshold value.

11. The motion detection system of claim 8, wherein the data processing apparatus is configured to detect motion based on a defined range of each channel response.

12. The motion detection system of claim 8, wherein the data processing apparatus is configured to store a number of samples, the samples being based on the channel responses, the motion detection being based on the samples.

13. The motion detection system of claim 8, wherein the motion detection includes:
determining a variance based on the channel responses; and
identifying when the motion occurs based on the variance exceeding a threshold value.

14. A motion detection system comprising:
receiver circuitry configured to receive wireless signals, the wireless signals being based on transmissions of a reference signal by a transmitter, each of the received wireless signals being based on a respective transmission of the reference signal at a distinct time; and
a data processing apparatus coupled to the receiver circuitry and configured to:
  determine channel responses based on the received wireless signals and the reference signal, each channel response being determined based on a respective one of the received wireless signals;
  determine respective correlation indices based on the received wireless signals and a stored signal representing an interference pattern; and
  detect motion of an object in a space based on the channel responses and correlation indices.

15. The motion detection system of claim 14, wherein the data processing apparatus is configured to detect motion based on a channel response when the correlation index of the respective received wireless signal is below a threshold value.

16. A method comprising:
at a receiver, receiving wireless signals from a communication channel, each wireless signal being based on a respective transmission of a reference signal by a transmitter;
by operation of one or more processors, determining channel responses based each of the wireless signals;
by operation of one or more processors, determining estimated received signals based on the reference signal and the channel responses; and
by operation of the one or more processors, detecting motion of an object in the communication channel based on the channel responses and the estimated received signals.

17. A method, comprising:
at a receiver, receiving wireless signals from a communication channel, each wireless signal being based on a respective transmission of a reference signal by a transmitter;
by operation of the one or more processors:
determining channel responses based on each of the wireless signals; and
for each of the wireless signals:
  determining whether the wireless signal includes a signal indicative of interference;
  determining whether a quality metric exceeds a first threshold value, the quality metric being based on a comparison of the wireless signal and an estimated received signal, the estimated received signal being based on the reference signal and the channel response; and
  passing at least a portion of the channel response when:
    the wireless signal is determined to not include a signal indicative of interference; and
    the quality metric exceeds the first threshold value; and
detecting motion of the object when a variance of passed channel responses exceeds a second threshold value.

18. The method of claim 17, wherein passing at least the portion of the channel response comprises passing a defined range of the channel response.

19. The method of claim 18, comprising:
determining respective energies of the passed channel responses;
storing a defined number of the respective energies; and
determining the variance of the respective energies that are stored.

20. The method of claim 17, wherein the determining whether the wireless signal includes a signal indicative of interference comprises:
determining respective correlation indices by correlating a signal strength of the wireless signal to signal profiles indicative of interference; and
identifying one of the correlation indices that has a highest correlation between the signal strength and a respective one of the signal profiles.

21. The method of claim 17, comprising:
passing the reference signal through a channel filter having the channel response to obtain the estimated received signal; and determining the quality metric by determining a dot product of the wireless signal and a difference of the estimated received signal and the wireless signal.

* * * * *

UNITED STATES PATENT AND TRADEMARK OFFICE
CERTIFICATE OF CORRECTION

PATENT NO. : 9,584,974 B1
APPLICATION NO. : 15/151571
DATED : February 28, 2017
INVENTOR(S) : Mohammad Omer et al.

It is certified that error appears in the above-identified patent and that said Letters Patent is hereby corrected as shown below:

On the Title Page

In (72) the correct spelling of the fourth inventor's name is: Marco Paulo dos Santos Nogueira Signed and Sealed this
Twentieth Day of February, 2018

Andrei Iancu
*Director of the United States Patent and Trademark Office*